United States Patent [19]

Jäger

[11] Patent Number: 4,971,322

[45] Date of Patent: Nov. 20, 1990

[54] BOWLING PIN OF SYNTHETIC MATERIAL

[75] Inventor: Andreas Jäger, Burgdorf, Fed. Rep. of Germany

[73] Assignee: Arnold Jäger, Burgdorf, Fed. Rep. of Germany

[21] Appl. No.: 337,019

[22] Filed: Apr. 12, 1989

[30] Foreign Application Priority Data

Apr. 12, 1988 [DE] Fed. Rep. of Germany ....... 3812464

[51] Int. Cl.⁵ .............................................. A63B 9/00
[52] U.S. Cl. ..................................................... 273/82 R
[58] Field of Search ...................................... 273/82 R

[56] References Cited

U.S. PATENT DOCUMENTS

| | | | |
|---|---|---|---|
| 2,357,458 | 9/1944 | Cloogh | 273/82 R |
| 3,147,974 | 9/1964 | Gruss et al. | 273/82 R |
| 3,229,977 | 1/1966 | Guglielmo, Sr. | 273/82 R |
| 3,240,646 | 3/1966 | Smith | 273/82 R |
| 3,306,960 | 2/1967 | Weissman | 273/82 R |
| 3,478,134 | 11/1969 | Gruss et al. | 273/82 R |
| 3,565,746 | 2/1971 | Stevens | 273/82 R |
| 3,988,403 | 10/1976 | Angell, Jr. et al. | 264/50 |
| 4,104,352 | 8/1978 | Morgan et al. | 264/250 |
| 4,457,511 | 7/1964 | Witkowski | 273/82 R |

*Primary Examiner*—Benjamin Layno
*Attorney, Agent, or Firm*—Robert W. Becker & Associates

[57] ABSTRACT

A bowling of synthetic material is provided. The pin has a core that is provided with pockets or cells, and also has a sheathing of solid wall construction. To achieve a particularly compact and thick outer shell, the core is also provided with an outer layer of solid wall construction that is disposed between the inner body of the core and the sheathing, and is fused with the sheathing. To provide the core with such an outer wall, the mold that receives the material that contains an expansion agent is cooled on the outside to such an extent that the expansion agent cannot become effective in the outer area.

10 Claims, 1 Drawing Sheet

U.S. Patent  Nov. 20, 1990  4,971,322
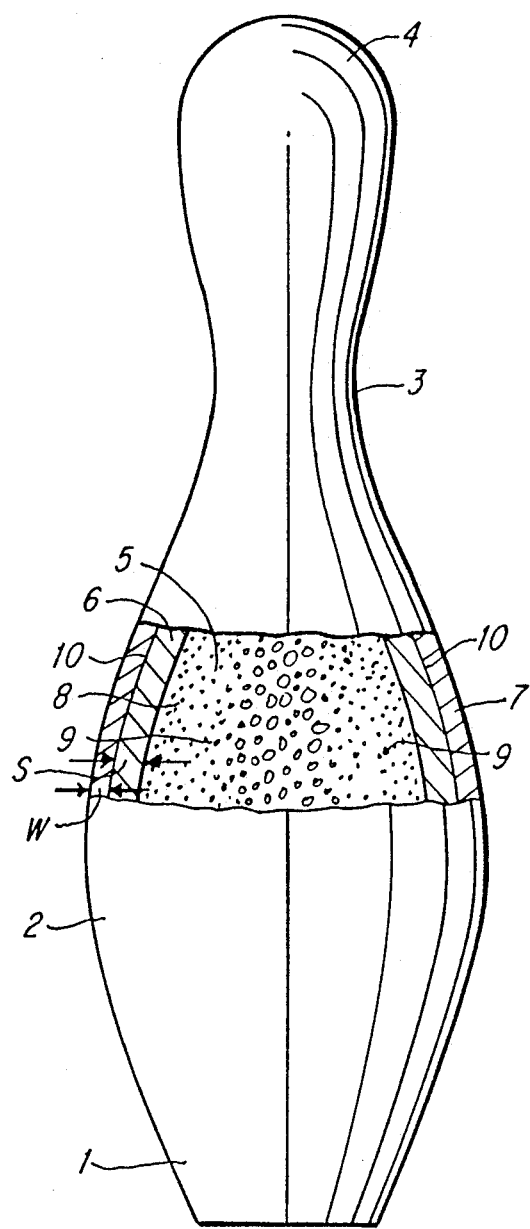

BOWLING PIN OF SYNTHETIC MATERIAL

BACKGROUND OF THE INVENTION

1. Field of the Invention

The present invention relates to a pin of synthetic material, especially polyamide, for a pin lane, and also including so-called bowling pins. The pin includes a core that is provided with pockets and/or cells during production by the addition of an expansion agent. The core is enveloped by a sheathing that is fixedly secured thereto; the sheathing is of solid wall construction and is essentially free of pockets and/or cells. The pin can, especially in the re g ion of its base, be provided with reinforcements, carrying means, fittings, or the like, which, however, are not part of the subject matter of the present invention.

The present invention also relates to methods of producing such a pin.

The phrase "of solid wall construction" is used within the context of the present invention to refer to a homogeneous construction that is essentially free of hollow spaces; thus, the plastic layer constructed in this manner has no or essentially no gas pockets.

2. Description of the Prior Art

It is well known that a pin experiences a relatively high mechanical stress when it is struck by a ball.

The aforementioned construction of a pin of synthetic material is expedient because its core is lightweight due to the presence of the gas pockets, and its sheathing, with the solid wall construction thereof, is a suitable shell-like strength-carrying member.

The bonding between the aforementioned core and the sheathing of solid wall construction is of great significance for the endurance strength of the pin. The adhesive surface brought about by the application of the sheathing to the core assures a good bonding when the surfaces that are to be connected to one another are smooth and as little roughened or full of fissures as possible.

It is therefore an object of the present invention for pins of the aforementioned general type, where the separately produced core is provided with the aforementioned sheathing by having the latter sprayed, etc., thereabout, to provide an increased and improved bonding between the core and the sheathing.

BRIEF DESCRIPTION OF THE DRAWING

This object, and other objects and advantages of the present invention, will appear more clearly from the following specification in conjunction with the accompanying schematic drawing, which is a partially sectioned view of one exemplary embodiment of the inventive pin, as a bowling pin.

SUMMARY OF THE INVENTION

The pin of the present invention is characterized primarily in that the core has an outer layer of solid wall construction disposed between the inner body of the core and the sheathing; in other words, this outer layer is also essentially free of pockets and/or cells. The outer layer and the sheathing are fixedly connected to one another, especially by being fused together.

The thickness of the outer layer is the same as, or preferably greater than, the thickness of the sheathing, and is advantageously approximately 1.2 to 1.8 times thicker.

Since the outer layer of the core is now of solid wall construction, it can have a smooth outer surface that is essentially free of localized depressions or the like, in order in this manner to receive a similarly embodied adhesive surface for the sheathing that is conventionally subsequently applied, for example by being sprayed thereon. The present invention additionally provides the possibility of making the solid wall layer that is formed from the outer layer of the core and from the sheathing relatively thick in order to impart to the pin body a correspondingly high shell rigidity.

It is furthermore particularly advantageous if the core of synthetic material, to which an expansion agent has been added, is molded in a mold having walls that are cooled, in order in this manner to avoid expansion in the outer area and to be able to achieve an outer layer of solid wall construction in a desired thickness. In this way, where the core is produced by injection molding or the like, it is possible to start with a material, preferably on a polyamide base, to which has been added an expansion agent.

A core produced in this manner is held in a centered manner in an oversized mold in order here to envelop the core by injection molding or the like with a sheathing of solid wall construction that is preferably also of a material that is on a polyamide base. Subsequent to this step, in order to improve the properties of the material, the pin is subjected to moisture (atmospheric, possibly a water bath). This can be done over a long period of time, for example several weeks, or can be done for a shorter period of time in a water bath at a water temperature of about 80° C.; this conditions the material of the pin.

Further specific features of the present invention will be described in detail subsequently.

DESCRIPTION OF PREFERRED EMBODIMENTS

Referring now to the drawing in detail, if one disregards the fittings that are possibly disposed at the base 1 of the pin and that serve for setting up the pin, the latter comprises polyamide throughout. In a known manner, disposed above the base 1 is the barrel 2 of the pin, thereabove the neck 3, and thereabove the head 4.

The body of the pin is essentially comprised of two parts, namely a core 5 on which is fixedly disposed an outer layer 6, and a sheathing 7. It is to be understood that these parts are fixedly and permanently heat-sealed or fused to one another.

The core 5 has an inner body 8 that is produced by an expansion agent additive. The inner body 8 has a foam structure and hence fine air or gas pockets 9, the size of which increases toward the interior of the inner body 8. The outer layer 6, in contrast, is of solid wall construction and has practically no pockets and cells; the outer layer 6 is provided with a smooth, non-roughened surface 10.

The sheathing 7 is similarly of solid wall construction; in other words, its character corresponds with that of the outer layer 6. As can be seen from the drawing, the aforementioned construction of the core 5 results so to speak in a double outer wall or shell for the pin, with the components thereof, due to the smooth character in the vicinity of the surface 10, being strongly and inseparably fused together, being comprised of practically the same material, but being distinguishable from one another due to their coloration.

The core 5 is initially separately molded from a material to which an expansion agent has been added, with the molding occurring in a greatly cooled-down mold body. The core 5 is then held in a larger, final mold in which it is centered, for example via spacers or the like. The sheathing 7 is then provided by filling the hollow space between the inner surface of the larger mold and the outer layer 6, for example by spraying or pouring in the material for the sheathing. In so doing, there results a strong bonding between the outer surface of the outer layer 6 and the sheathing 7 in the surface 10. At the higher temperature that prevails in this connection, the materials are changed into such a state that a fusing occurs. This results in a compact outer shell that has a relatively thick wall, is practically free of pockets, cells, or the like, and is of sufficient size to resist impact stresses, whereas within the outer layer 6 there results a foamed structure, i.e. one with pockets and/or cells, that in turn also merges integrally into the outer layer 6.

The thickness "s" of the outer layer 6 is, on average, approximately 1.3–1.5 times greater than the thickness "w" of the sheathing 7, which can have an average value of approximately 2.5–8 mm. Differing thicknesses can also be used, with the neck portion possibly having a greater thickness.

Glass fibers, which are preferably disposed in an irregular pattern, can be added to the core 5, and in particular in a proportion of approximately 10–40, and preferably 20–30, percent by weight. This glass fiber material is added to the remaining core material; all of the constituents are then shaped in a mold as described above.

The glass fiber material not only has the advantage of providing reinforcement and strengthening, but also has the advantage that the foam structure is formed more uniformly, which is expressed in more uniform hollow spaces that are essentially of the same size.

It is furthermore advantageous for the core, after its manufacture, i.e. before it is provided with the outer layer 6 to be annealed or tempered at temperatures of approximately 100–250° C., preferably approximately 200° C. and generally in a heat unit, for approximately 15–100 minutes, preferably approximately 30 minutes. As a consequence of this thermal treatment, expansion agent that might still be present in the core can escape. This is important because if the expansion agent is not removed by the tempering, it could later pass into the sheathing 7, where it could cause damage, such as cracks.

The present invention is, of course, in no way restricted to the specific disclosure of the specification and drawing, but also encompasses any modifications within the scope of the appended claims.

What I claim is:

1. In a pin of synthetic material, for a pin lane, with said pin having a core with an inner pin body that is provided with pockets and/or cells by addition of an expansion agent, and with said pin also having a sheathing that envelops said core, whereby said sheathing in a solid plastic layer is of solid wall homogeneous construction that is essentially free of pockets and/or cells, comprising the improvement therewith wherein:

said core has an outer layer disposed between said inner body of said core and said sheathing as a shell-like strength-carrying member with the solid wall homogeneous construction with a smooth outer surface essentially free of any localized depressions, with said outer layer also being essentially free of pockets and/or cells, and with said outer layer and said sheathing being fixedly connected and bonded to one another in order to impart to the pin body a correspondingly high shell rigidity.

2. A pin according to claim 1, which is made of polyamide.

3. A pin according to claim 1, in which said outer layer of said core and said sheathing are fused together.

4. A pin according to claim 1, in which said outer layer has a thickness that is greater than the thickness of said sheathing.

5. A pin according to claim 4, in which said thickness of said outer layer is 1.2 to 1.8 times greater than said thickness of said sheathing.

6. A pin according to claim 1, in which the size of said pores and/or cells of said inner body of said core increase in a direction from said outer layer of essentially solid wall construction toward the interior of said inner body.

7. A pin according to claim 1, in which said outer layer and said sheathing are of different colors.

8. A pin according to claim 1, in which said core contains glass fibers that are disposed in an irregular pattern.

9. A pin according to claim 1, in which said glass fibers comprise approximately 10 to 40% by weight of the total weight of said core.

10. A pin according to claim 9, in which said glass fibers comprise 20 to 30% by weight of the total weight of said core.

* * * * *